April 11, 1967

J. L. HEARD 3,314,008

CIRCUIT EMPLOYING CALIBRATED VARIABLE IMPEDANCES FOR
MEASURING TRANSISTOR BETA AND BETA CUTOFF FREQUENCY

Filed Oct. 28, 1963

INVENTOR.
JAMES L. HEARD,
BY
Paul M. Coble
ATTORNEY.

United States Patent Office 3,314,008
Patented Apr. 11, 1967

3,314,008
CIRCUIT EMPLOYING CALIBRATED VARIABLE IMPEDANCES FOR MEASURING TRANSISTOR BETA AND BETA CUTOFF FREQUENCY
James L. Heard, Manhattan Beach, Calif., assignor to Hughes Aircraft Company, Culver City, Calif., a corporation of Delaware
Filed Oct. 28, 1963, Ser. No. 319,105
11 Claims. (Cl. 324—158)

This invention relates to transistor test circuitry, and more particularly relates to a circuit for rapidly and expediently measuring the current gain $\beta$ and the $\beta$ cutoff frequency of a transistor.

Two parameters of importance to the designer and user of transistor circuits are the transistor common emitter current gain $\beta$ and the $\beta$ cutoff frequency $f_\beta$ at which the magnitude of $\beta$ is 3 db below its low frequency value. In the past, while the measurement of $\beta$ has been a relatively simple task, the determination of the $\beta$ cutoff frequency for a transistor has proven to be an extremely complex and time-consuming operation. Prior art techniques for determining the $\beta$ cutoff frequency have required that a series of measurements and rather involved calculations be made by a technically trained person. According to one exemplary technique, input impedance measurements are first made for each transistor at a number of different frequencies, after which the value of $\beta$ at each of the test frequencies is computed by means of an approximate relationship involving the impedance data. A graph illustrating $\beta$ as a function of frequency is then plotted, and the cutoff frequency $f_\beta$ is determined from this graph. Prior art methods of this nature are not only extremely involved and time-consuming, but they must be carried out by a technically skilled person familiar with complex numbers.

Accordingly, it is an object of the present invention to provide a test circuit for measuring the cutoff frequency of a gain figure such as the current gain $\beta$ of a transistor more simply and rapidly than has heretofore been possible. In fact, while the $\beta$ cutoff frequency measurement formerly required a skilled operator an hour or so to perform, with the circuit of the present invention a relatively untrained person can make the measurement in a matter of seconds.

It is a further object of the present invention to provide a uniquely designed bridge circuit for rapidly and inexpensively measuring the $\beta$ cutoff frequency $f_\beta$, as well as the common emitter current gain $\beta$, of a transistor over a wide range of frequencies. All that is required in carrying out the measurements is adjusting two calibrated dials until a balanced condition is obtained, and reading the measured values of $\beta$ and $f_\beta$ from the two dials.

It is a still further object of the present invention to provide a circuit which measures both the current gain $\beta$ and the $\beta$ cutoff frequency of a transistor independently of the frequency of operation of the measuring circuit so that a fixed frequency oscillator and a narrow band null detector may be employed, thereby affording great simplicity and low cost for the circuit.

It is yet another object of the present invention to provide a simple and efficient technique for rapidly and accurately measuring the gain figure of a transistor and the frequency at which the gain figure is a predetermined portion of its maximum value.

In accordance with the foregoing objects the present invention provides a bridge circuit including first and second terminals adapted to be connected to respective first and second electrodes of a transistor between which the gain figure is to be measured and a third terminal for connection to a third electrode of the transistor. Relative D.C. potentials are applied between the first, second and third terminals to bias the transistor in its amplification region of operation. A variable impedance having an impedance vs. frequency characteristic similar to that of the transistor to be tested is coupled between the second and third terminals. A first A.C. voltage at a given frequency is applied between the first and third terminals, while a second A.C. voltage at the same frequency is applied to the variable impedance. Means such as an A.C. null detector is provided to measure the A.C. potential between the second and third terminals so that when a balanced condition is indicated the impedance of the impedance means is indicative of the frequency to be measured and the relative amplitude of the first and second A.C. voltages is indicative of the gain figure to be measured.

Additional objects, advantages and characteristic features of the invention will become readily apparent from the following detailed description of a preferred embodiment of the invention when taken in conjunction with the accompanying drawing in which.

Figure 1:
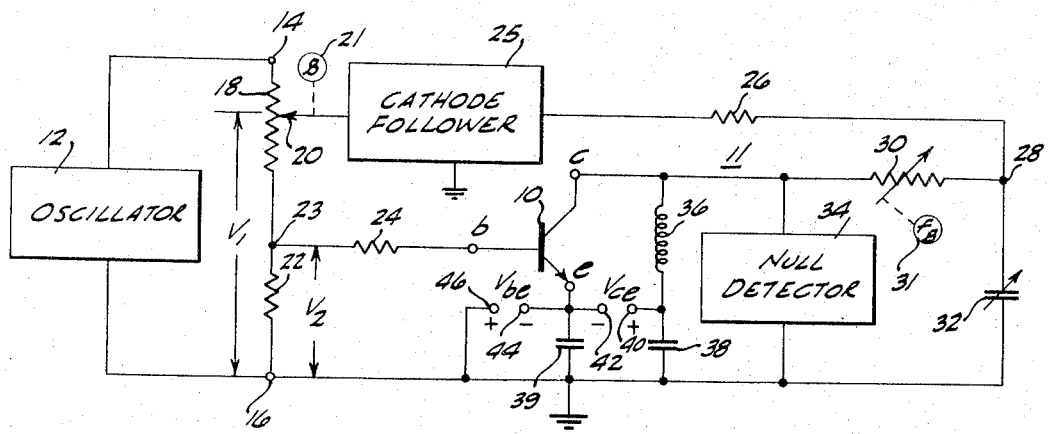
FIG. 1 is a schematic circuit diagram, partially in block form, of a transistor test circuit provided according to the principles of the present invention.

Referring now to FIG. 1, a test circuit according to the invention is shown for measuring the current gain $\beta$ and the $\beta$ cutoff frequency $f_\beta$ of an NPN transistor 10. It is pointed out that although an NPN transistor is shown, the circuit is equally suitable for testing PNP transistors and can be so used simply by reversing the polarities of the D.C. bias potentials illustrated in FIG. 1. The test circuit includes a bridge arrangement 11, with the transistor 10 being connected in one side of the bridge arrangement and a variable impedance having an impedance vs. frequency characteristic similar to that of transistor 10 being connected in the other side of the bridge network. The circuit parameters are selected such that when a balanced condition is achieved in the bridge 11, direct readings of the current gain $\beta$ and the cutoff frequency $f_\beta$ of the transistor 10 may be obtained.

An A.C. test signal is applied to the bridge circuit 11 from an oscillator 12 having output terminals 14 and 16. The oscillator 12 provides a sinusoidal voltage of frequency $f$ which, although in principle may be almost any frequency, for maximum sensitivity it has been found desirable to use a frequency of operation within a decade of the cutoff frequency $f_\beta$.

A potentiometer 18, having a movable tap 20, and a resistor 22 are connected in series between the oscillator terminals 14 and 16, the terminal 16 being connected to a level of reference potential illustrated as ground in FIG. 1. The voltage appearing between the movable potentiometer tap 20 and the ground terminal 16 is designated as $V_1$, while the voltage across the resistor 22 is indicated by $V_2$. The potentiometer 18 is the "$\beta$-measuring" element in the circuit since, for reasons which will become clearer later, the setting of the potentiometer tap 20 is determined by the $\beta$ of the transistor 10 being tested when a null condition is achieved in the bridge network. Thus, a dial 21 controlling the movement of the potentiometer tap 20 may be calibrated in units of $\beta$ rather than resistance so that the measured value of $\beta$ may be read directly from the dial 21.

The voltage $V_2$ appearing at the junction 23 between the potentiometer 18 and the resistor 22 is applied to the transistor 10 being tested by means of a resistor 24 connected between the junction 23 and a terminal $b$ connected to the base electrode of the transistor 10. The resistance of the resistor 24 is considerably greater than the base-emitter input resistance of the transistor 10.

The signal at the potentiometer tap 20 is fed to the input of a cathode follower 25 which may include a triode vacuum tube for example. The cathode follower 25 improves the impedance match between the oscillator 12 and the bridge network 11 and thereby reduces the loading effect of the bridge network on the oscillator. The cathode follower output is in turn applied through a resistor 26 to a junction point 28. The resistance of the resistor 26 is made equal to the resistance of the resistor 24. A variable resistor 30 of a maximum resistance substantially smaller than the resistance of resistor 26 is connected between the junction point 28 and a terminal $c$ connected to the collector of the transistor 10 undergoing the test. The variable resistor 30 is the "$f_\beta$-measuring" element in the circuit since its resistance value is determined by the cutoff frequency $f_\beta$ of the transistor 10 being tested. Thus, a dial 31 controlling the resistance of the resistor 30 may be calibrated in units of frequency rather than resistance so that the measured value of $f_\beta$ may be read directly from this dial. Connected between the junction point 28 and ground is a variable capacitor 32 which in conjunction with the resistor 30 forms a variable impedance RC network the time constant of which is of importance in the determination of the cutoff frequency $f_\beta$. Although it is preferred to set the capacitance of the capacitor 32 at a predetermined value prior to the testing and vary the resistance of the resistor 30 during the measurement of $f_\beta$, it is also possible to preset the resistor 30 at a predetermined resistance value and alter the capacitance of the capacitor 32 during the testing, or alternatively to vary both the resistor 30 and the capacitor 32 during the testing operation.

In order to detect a balanced condition in the bridge 11 a null detector 34, which may be a narrow band tuned frequency A.C. null detector, is connected between the collector terminal $c$ and ground. Connected in series across the null detector 34 are an inductor 36 and a capacitor 38, with a capacitor 39 being connected between a terminal $e$ connected to the emitter of the transistor 10 and ground. The inductor 36 provides a low impedance for the D.C. component of collector current of the transistor 10 and a high impedance for A.C. signals at the test frequency, while the capacitors 38 and 39 isolate the D.C. bias potentials from the A.C. circuitry.

In order to bias the transistor 10 in its amplification region of operation, there are provided a first pair of D.C. bias terminals 40 and 42 and a second pair of D.C. bias terminals 44 and 46. The bias terminals 40 and 42 are connected respectively to the junction between the inductor 36 and the capacitor 38 and to the emitter terminal $e$ for the transistor 10, while the terminals 44 and 46 are connected respectively to the terminal $e$ and to ground. The collector-emitter bias $V_{ce}$ (which may vary essentially between zero and 50 volts D.C. depending on the particular characteristics of the transistor 10) is applied between the terminals 40 and 42, while the base-emitter bias $V_{be}$ (used to supply a desired base current to the transistor 10 of from essentially zero to 1 ma. depending on the particular transistor involved) is applied between terminals 46 and 44. The polarities of the bias voltages $V_{be}$ and $V_{ce}$ are as indicated in FIG. 1 for an NPN transistor, it being understood that for a PNP transistor the polarities of these bias voltages would be opposite from that shown.

In the operation of the circuit of the present invention to measure both the current gain $\beta$ and the $\beta$ cutoff frequency $f_\beta$, the transistor 10 to be tested is inserted in the circuit of FIG. 1. D.C. bias supplies (not shown) are then turned on to apply the appropriate D.C. bias potentials $V_{ce}$ and $V_{be}$ (selected from characteristic curves of the transistor undergoing testing) to the transistor 10. Next, the oscillator 12 is turned on to apply the A.C. test voltages $V_1$ and $V_2$ of frequency $f$ to the transistor 10. The dials 21 and 31 governing the position of the potentiometer tap 20 and the resistance of the variable resistor 30, respectively, are then adjusted simultaneously until a balanced condition in the bridge network 11 is achieved as indicated by a minimum A.C. voltage reading across the null detector 34. When balance has been achieved in the circuit, the value of the current gain $\beta$ of the transistor 10 is read from the dial 21 controlling the potentiometer tap 20, and the value of the cutoff frequency $f_\beta$ for the transistor 10 is read from the control dial 31 for the resistor 30.

In order to gain a better understanding of the present invention, the following mathematical analysis of the behavior of the circuit of FIG. 1 will be presented. In the frequency range of interest the common emitter current gain $\beta$ as a function of circuit operation frequency $f$ may be expressed as:

$$\beta = \frac{\beta_0}{1+jf/f_\beta} \quad (1)$$

where $\beta_0$ is the low frequency value of $\beta$, and $f_\beta$ is the frequency at which the magnitude of $\beta$ is $1/\sqrt{2}$ of $\beta_0$ (i.e., is 3 db below $\beta_0$).

Figure 2:
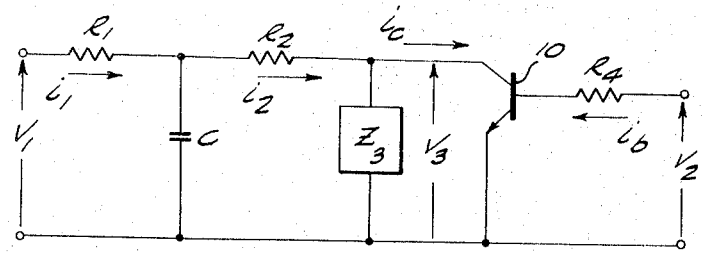
FIG. 2 illustrates a high frequency equivalent circuit for the circuit of FIG. 1 which is used in explaining the theory of the invention.

The behavior of the bridge network 11 in the circuit of FIG. 1 may be analyzed by the equivalent circuit shown in FIG. 2 in which $R_1$ represents the resistance of resistor 26, C designates the capacitance of capacitor 32, $R_2$ represents the resistance of resistor 30, $Z_3$ represents the net impedance in parallel with the collector-emitter of the transistor 10 including the impedance of the null detector 34 and of the inductor 36 and capacitor 38, and $R_4$ represents the resistance of the resistor 24. The D.C. bias network for establishing the operating point of the transistor 10 has been neglected since it does not form a part of the A.C. bridge circuit, and in view of the negligible voltage drop across the cathode follower 25, the voltage $V_1$ is assumed to be applied directly to the resistor 26 ($R_1$). The current through resistor $R_1$ is designated as $i_1$, while $i_2$ designates the current flow through the resistor $R_2$ of FIG. 2. Since the resistance $R_4$ of resistor 24 of FIG. 1 is much greater than the base-emitter input resistance of the transistor 10, the base current $i_b$ (FIG. 2) may be seen to be given by:

$$i_b = \frac{V_2}{R_4} \quad (2)$$

The collector current $i_c$ for the transistor 10 thus becomes:

$$i_c = \beta i_b = \frac{\beta_0 V_2/R_4}{1+jf/f_\beta} \quad (3)$$

Figure 3:
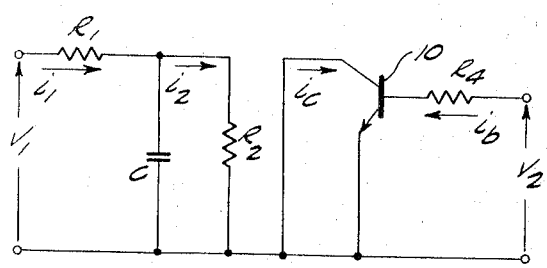
FIG. 3 illustrates an equivalent circuit for the circuit of FIG. 2 when a null condition is achieved, and which circuit is also used in explaining the theory of the invention.

When a null condition has been achieved in the circuit of FIG. 1, the voltage across the null detector 34 is zero, and no current flows through the null detector. Thus in FIG. 2, $V_3=0$ and $i_2=i_c$, and the behavior of the circuit of FIG. 2 under a null condition may be depicted by the equivalent circuit shown in FIG. 3. The current $i_2$ becomes:

$$i_2 = \frac{V_1/(R_1+R_2)}{1+j2\pi f R_1 R_2 C/(R_1+R_2)} = \frac{\beta_0 V_2/R_4}{1+jf/f_\beta} \quad (4)$$

Equating the respective real and imaginary parts of Equation 4 gives:

$$\beta_0 = \frac{V_1}{V_2} \cdot \frac{R_4}{R_1+R_2} \quad (5)$$

and $$f_\beta = \frac{R_1+R_2}{2\pi R_1 R_2 C} \quad (6)$$

Since the resistance of resistor 26 is much greater than the resistance of resistor 30 (i.e., $R_1 \gg R_2$), Equation 5 becomes:

$$\beta_0 \approx \frac{V_1}{V_2} \cdot \frac{R_4}{R_1} \quad (7)$$

and Equation 6 reduces to:

$$f_\beta \approx \frac{1}{2\pi R_2 C} \quad (8)$$

Since the resistance of resistors 26 and 24 are equal (i.e. $R_1 = R_4$), Equation 7 reduces to:

$$\beta_0 \approx \frac{V_1}{V_2} \quad (9)$$

It may be seen that Equations 9 and 8, respectively, govern the values of $\beta_0$ and $f_\beta$ at a null condition in the circuit of FIG. 1. Since $\beta_0$ is a function of the voltage ratio $V_1/V_2$ and for a given oscillator voltage between the terminals 14 and 16, the voltage $V_2$ is fixed, the measured value of $\beta_0$ is determined by the setting of the potentiometer tap 20 under a null condition. Similarly, from Equation 8 it may be seen that when the bridge is in a null, or balanced, condtion, for a preselected capacitance C of the capacitor 32, the cutoff frequency $f_\beta$ is determined by the resistance value $R_2$ of the variable resistor 30. Since the respective dials 21 and 31 controlling the setting of the potentiometer tap 20 and the resistance of the variable resistor 30 are calibrated in units of $\beta_0$ and frequency, respectively, the measured values of $\beta_0$ and $f_\beta$ may be read directly from these dials when a balanced condition is achieved in the circuit of FIG. 1. Thus, both $\beta$ and $f_\beta$ may be accurately determined in a simple and rapid manner merely by varying two calibrated dials until a balanced condition is achieved in the circuit, after which the measured values may be read from the two dials.

It will be appreciated that the circuit of the present invention may be employed to measure transistor gain figures and gain figures cutoff frequencies other than the current gain $\beta$ and the $\beta$ cutoff frequency $f_\beta$. For example, the circuit may be used to measure the common base current gain $\alpha$ and the $\alpha$ cutoff frequency $f_\alpha$ simply by employing resistance values for the resistors 24, 26 and 30 and biases $V_{eb}$ and $V_{cb}$ appropriate to the common base configuration. Thus, although the invention has been shown and described with reference to a particular embodiment, changes and modifications obvious to a person skilled in the art are deemed to be within the spirit and scope of the invention as set forth in the appended claims.

What is claimed is:

1. A test circuit for measuring the frequency at which the gain figure of a transistor between first and second ones of its electrodes is a predetermined portion of the maximum value of the gain figure comprising: first and second terminals adapted to be connected to the respective first and second electrodes of the transistor to be tested and a third terminal adapted to be connected to a third electrode of the transistor; means for applying D.C. potentials between said first, second and third terminals to bias the transistor to be tested in its amplification region of operation; impedance means coupled between said second and third terminals and having a variable impedance vs. frequency characteristic similar to that measured between the second and third electrodes of the transistor to be tested; means for applying a first A.C. voltage at a given frequency between said first and third terminals; and means for applying a second A.C. voltage at said given frequency to said impedance means; means for measuring the A.C. potential between said second and third terminals; and means calibrated as a function of the frequency to be measured for varying the impedance vs. frequency characteristic of said impedance means to achieve a minimum A.C. potential between said second and third terminals, with the impedance of said impedance means then being indicative of the frequency to be measured.

2. A test circuit for measuring the frequency at which the gain figure of a transistor between first and second ones of its electrodes is a predetermined portion of the maximum value of the gain figure comprising: first and second terminals adapted to be connected to the respective first and second electrodes of the transistor to be tested and a third terminal adapted to be connected to a third electrode of the transistor; means for applying D.C. potentials between said first, second and third terminals to bias the transistor to be tested in its amplification region of operation; impedance means coupled between said second and third terminals and including a plurality of impedance elements at least one of which provides a variable impedance; means for applying a first A.C. voltage at a given frequency between said first and third terminals; means for applying a second A.C. voltage at said given frequency to said one of said impedance elements; means for measuring the A.C. potential between said second and third terminals; and means calibrated as a function of the frequency to be measured for varying the impedance of said one of said impedance elements to achieve a minimum A.C. potential between said second and third terminals, with the impedance of said impedance element then being indicative of the frequency to be measured.

3. A test circuit for measuring the gain figure of a transistor between first and second ones of its electrodes and the frequency at which the gain figure is a predetermined portion of its maximum value comprising: first and second terminals adapted to be connected to the respective first and second electrodes of the transistor to be tested and a third terminal adapted to be connected to a third electrode of the transistor; means for applying D.C. potentials between said first, second and third terminals to bias the transistor to be tested in its amplification region of operation; impedance means coupled between said second and third terminals and having a variable impedance vs. frequency characteristic similar to that measured between the second and third electrodes of the transistor to be tested; means for applying a first A.C. voltage at a given frequency between said first and third terminals; means for applying a second A.C. voltage at said given frequency to said impedance means; means for measuring the A.C. potential between said second and third terminals; means calibrated as a function of the frequency to be measured for varying the impedance vs. frequency characteristic of said impedance means; and means calibrated as a function of the gain figure to be measured for varying the amplitude of one of said first and second A.C. voltages relative to the amplitude of the other to achieve a minimum A.C. potential between said second and third terminals, with the impedance of said impedance means then being indicative of the frequency to be measured and the relative amplitude of said first and second A.C. voltages then being indicative of the gain figure to be measured.

4. A test circuit for measuring the gain figure of a transistor between first and second ones of its electrodes and the frequency at which the gain figure is a predetermined portion of its maximum value comprising: first and second terminals adapted to be connected to the respective first and second electrodes of the transistor to be tested and a third terminal adapted to be connected to a third electrode of the transistor; means for applying D.C. potentials between said first, second and third terminals to bias the transistor to be tested in its amplification region of operation; impedance means coupled between said second and third terminals and including a plurality of impedance elements at least one of which provides a variable impedance; means for applying a first A.C. voltage at a given frequency between said first and third terminals; means for applying a second A.C. voltage at said given frequency to said one of said impedance elements; means for measuring the A.C. potential between said second and third terminals; means calibrated as a function of the frequency to be measured for varying the impedance of said one of said impedance elements and means calibrated as a function of the gain figure to be measured for varying the amplitude of one of said first and second A.C. voltages relative to the amplitude of the other to achieve a minimum A.C. potential between said second and third terminals, with the impedance of said one of said impedance elements then being indicative of the frequency to be measured and the relative amplitude of said first and second A.C. voltages being indicative of the gain figure to be measured.

5. A test circuit for measuring the frequency at which the common emitter current gain $\beta$ of a transistor is a predetermined portion of its maximum value comprising: first, second and third terminals adapted to be connected respectively to the base, collector and emitter electrodes of the transistor to be tested; means for applying D.C. potentials between said first, second and third terminals to bias the transistor to be tested in its amplification region of operation; impedance means coupled between said second and third terminals and having a variable impedance vs. frequency characteristic similar to that of the collector-emitter impedance of the transistor to be tested; means for applying a first A.C. voltage at a given frequency between said first and third terminals; means for applying a second A.C. voltage at said given frequency to said impedance means; means for measuring the A.C. potential between said second and third terminals; and means calibrated as a function of the frequency to be measured for varying the impedance vs. frequency characteristic of said impedance means to achieve a minimum A.C. potential between said second and third terminals, with the impedance of said impedance means then being indicative of the frequency to be measured.

6. A test circuit for measuring the common emitter current gain $\beta$ of a transistor and the frequency at which the current gain $\beta$ is a predetermined portion of its maximum value comprising: first, second and third terminals adapted to be connected respectively to the base, collector and emitter electrodes of the transistor to be tested; means for applying D.C. potentials between said first, second and third terminals to bias the transistor to be tested in its amplification region of operation; impedance means coupled between said second and third terminals and having a variable impedance vs. frequency characteristic similar to that of the collector-emitter impedance of the transistor to be tested; means for applying a first A.C. voltage at a given frequency between said first and third terminals; means for applying a second A.C. voltage at said given frequency to said impedance means; means for measuring the A.C. potential between said second and third terminals; means calibrated as a function of the frequency to be measured for varying the impedance vs. frequency characteristic of said impedance means; and means calibrated as a function of the current gain $\beta$ to be measured for varying the amplitude of one of said first and second A.C. voltages relative to the amplitude of the other to achieve a minimum A.C. potential between said second and third terminals, with the impedance of said impedance means then being indicative of the frequency to be measured and the relative amplitude of said first and second A.C. voltages then being indicative of the current gain $\beta$ to be measured.

7. A test circuit for measuring the frequency at which the gain figure of a transistor between first and second ones of its electrodes is a predetermined portion of the maximum value of the gain figure comprising: means for biasing the transistor under test in its amplification region of operation, a first resistor providing a resistance substantially larger than the resistance of said transistor measured between the first and a third one of its electrodes, said first resistor having one terminal coupled to said first electrode of said transistor, a second resistor providing a variable resistance substantially smaller than the resistance of said first resistor and having one terminal coupled to the second electrode of said transistor, a capacitor coupled between the other terminal of said second resistor and said third electrode of said transistor, a third resistor providing a resistance essentially equal to the resistance of said first resistor and having one terminal coupled to said other terminal of said second resistor, a source of alternating voltage at a given frequency, means for applying at least a portion of said alternating voltage between the other terminal of said third resistor and said third electrode of said transistor, means for applying a portion of said alternating voltage between the other terminal of said first resistor and said third electrode, and an A.C. null detector coupled between said second and third electrodes of said transistor.

8. A test circuit for measuring the cutoff frequency of the common emitter current gain $\beta$ of a transistor comprising: means for biasing the transistor under test in its amplification region of operation, a first resistor providing a resistance substantially larger than the base-emitter input resistance of said transistor and having one terminal coupled to the base electrode of said transistor, a second resistor providing a variable resistance substantially smaller than the resistance of said first resistor and having one terminal coupled to the collector electrode of said transistor, a capacitor coupled between the other terminal of said second resistor and the emitter electrode of said transistor, a third resistor providing a resistance essentially equal to the resistance of said first resistor and having one terminal coupled to said other terminal of said second resistor, a source of alternating voltage at a given frequency, means for applying at least a portion of said alternating voltage between the other terminal of said third resistor and the emitter electrode of said third resistor, means for applying a portion of said alternating voltage between the other terminal of said first resistor and the emitter electrode of said transistor, and an A.C. null detector coupled between the collector and emitter electrodes of said transistor.

9. A test circuit for measuring the gain figure of a transistor between first and second ones of its electrodes and the frequency at which the gain figure is a predetermined portion of its maximum value comprising: means for biasing the transistor under test in its amplification region of operation, a first resistor providing a resistance substantially larger than the resistance of said transistor measured between the first and a third one of its electrodes, said first resistor having one terminal coupled to said first electrode of said transistor, a second resistor providing a variable resistance substantially smaller than the resistance of said first resistor and having one terminal coupled to the second electrode of said transistor, a capacitor coupled between the other terminal of said second resistor and said third electrode of said transistor, a third resistor providing a resistance essentially equal to the resistance of said first resistor and having one termial coupled to said other terminal of said second resistor, a source of alternating voltage at a given frequency, means for applying at least a portion of said alternating voltage between the other terminal of said third resistor and said third electrode of said transistor, means for applying a portion of said alternating voltage between the other terminal of said first resistor and said third electrode, at least one of said means for applying being variable so that the relative amplitude of the alternating voltages applied to said first and third resistors is variable, and an A.C. null detector coupled between said second and third electrodes of said transistor.

10. A test circuit for measuring the common emitter current gain $\beta$ of a transistor and the cutoff frequency of the current gain $\beta$ comprising: means for biasing the transistor under test in its amplification region of operation, a first resistor providing a resistance substantially larger than the base-emitter input resistance of said transistor and having one terminal coupled to the base electrode of said transistor, a second resistor providing a variable resistance substantially smaller than the resistance of said first resistor and having one terminal coupled to the collector electrode of said transistor, a capacitor coupled between the other terminal of said second resistor and the emitter electrode of said transistor, a third resistor providing a resistance essentially equal to the resistance of said first resistor and having one terminal coupled to said other terminal of said second resistor, a source of alternating voltage at a given frequency, means for applying at least a portion of said alternating voltage between the other terminal of said third resistor and the emitter electrode of said transistor, means for applying a portion of said alternating voltage between the other terminal of said first resistor and the emitter electrode of said transistor, at least one of said means for applying being variable so that the relative amplitude of the alternating voltages applied to said first and third resistors is variable, and an A.C. null detector coupled between the collector and emitter electrodes of said transistor.

11. A test circuit for measuring the common emitter current gain $\beta$ of a transistor and the cutoff frequency of the current gain $\beta$ comprising: means for biasing the transistor under test in its amplification region of operation, a first resistor providing a resistance substantially larger than the base-emitter input resistance of said transistor and having one terminal coupled to the base electrode of said transistor, a second resistor providing a variable resistance substantially smaller than the resistance of said first resistor and having one terminal coupled to the collector electrode of said transistor, a capacitor coupled between the other terminal of said second resistor and the emitter electrode of said transistor, a third resistor providing a resistance essentially equal to the resistance of said first resistor and having one terminal coupled to said other terminal of said second resistor, a source of alternating voltage at a given frequency and having first and second terminals, said second terminal being coupled to the emitter electrode of said transistor, a fourth resistor having one terminal coupled to said second terminal, a potentiometer coupled between said first terminal and the other terminal of said fourth resistor, said potentiometer having a movable tap coupled to the other terminal of said third resistor, the other terminal of said first resistor being coupled to said other terminal of said fourth resistor, an A.C. null detector coupled between the collector and emitter electrodes of said transistor, means calibrated as a function of the current gain $\beta$ to be measured for varying the position of said potentiometer tap and means calibrated as a function of the cutoff frequency to be measured for varying the resistance of said second resistor so that when a minimum A.C. potential exists between the collector and emitter electrodes of said transistor the position of said potentiometer tap is indicative of the current gain $\beta$ and the resistance of said second resistor is indicative of the cutoff frequency of the current gain $\beta$.

References Cited by the Examiner
UNITED STATES PATENTS 2,909,730 10/1959 Timm _____ 324—158
3,054,948 9/1962 Rymaszewski _____ 324—158 X WALTER L. CARLSON, *Primary Examiner.*
E. L. STOLARUN, *Assistant Examiner.*